United States Patent [19]
Henderson et al.

[11] Patent Number: 5,863,642
[45] Date of Patent: Jan. 26, 1999

[54] WATER RESISTANT AND VAPOR PHASE CORROSION INHIBITOR COMPOSITE MATERIAL

[75] Inventors: Eric Henderson, North Bay; Lorence J. Reed, Callander, both of Canada; Kevin D. Jagielski, Minneapolis, Minn.

[73] Assignee: Fabrene, Inc., North Bay, Canada

[21] Appl. No.: 686,539

[22] Filed: Jul. 26, 1996

[51] Int. Cl.$^6$ .............................. B32B 7/02; B32B 5/08; B32B 27/32
[52] U.S. Cl. .............................. 428/218; 239/60; 442/41; 442/62; 442/290
[58] Field of Search .............................. 428/68, 74, 75, 428/76, 305.5, 218; 442/2, 26, 38, 255, 236, 62, 64, 41, 290; 239/60

[56] References Cited

U.S. PATENT DOCUMENTS

| | | | |
|---|---|---|---|
| 4,188,445 | 2/1980 | Hill | 428/246 |
| 4,302,496 | 11/1981 | Donovan | 428/196 |
| 4,368,233 | 1/1983 | Barkis et al. | 428/245 |
| 4,421,827 | 12/1983 | Phillips | 428/418 |
| 4,973,448 | 11/1990 | Carlson | 422/9 |
| 5,102,726 | 4/1992 | Gabbay | 428/251 |
| 5,139,700 | 8/1992 | Miksic et al. | 252/389.54 |
| 5,187,005 | 2/1993 | Stahle et al. | 428/252 |
| 5,209,869 | 5/1993 | Misksic et al. | 252/389.54 |
| 5,332,525 | 7/1994 | Miksic et al. | 252/389.54 |
| 5,715,945 | 2/1998 | Chandler | 206/524.4 |

FOREIGN PATENT DOCUMENTS

| | | |
|---|---|---|
| 0215480 | 3/1987 | European Pat. Off. . |
| 27 37 495 | 3/1979 | Germany . |
| 3518625 A1 | 11/1986 | Germany . |
| 2149721 | 6/1985 | United Kingdom . |

OTHER PUBLICATIONS

Derwent Printout (1 page) 95–007261 (Jan. 1995).
WO98/04410 PCT Application, PCT International Search Report and International Preliminary Examination Report (25 pages)–(Feb. 5, 1998).

*Primary Examiner*—Richard D. Lovering
*Attorney, Agent, or Firm*—Merek & Voorhees

[57] ABSTRACT

A water resistant and vapour phase corrosion inhibitor composite material for wrapping around metallic items for protection and to reduce corrosion during storage and transportation. The composite material comprises a high strength, tear resistant, flexible scrim, a low density layer impregnated with a solid form vapour phase corrosion inhibitor, and a barrier layer to reduce the transmission of water, water vapour, oxygen and other environmental gases through the composite material. The barrier layer also reduces the atmospheric loss of gaseous vapour phase corrosion inhibitor from around the wrapped item. Each layer is formed from a polyolefin material to create a multi-layered polyolefin composite material that is easily recyclable.

19 Claims, 1 Drawing Sheet

WATER RESISTANT AND VAPOR PHASE CORROSION INHIBITOR COMPOSITE MATERIAL

FIELD OF THE INVENTION

This invention relates to composite materials that may be used to provide coverings or wrappings for metal parts, machinery and other materials to protect them from the effects of corrosion and interaction with environmental gases. In particular, the invention provides a water resistant and vapour phase corrosion inhibitor composite material that can be used to shield and protect metal parts, machinery and materials during storage and transportation to reduce corrosion and oxidation.

BACKGROUND OF THE INVENTION

The corrosion of metallic parts and raw materials is a problem that is encountered by manufacturers, transportation companies, retailers and the consuming public alike. Unchecked corrosion can lead to a reduction in value or a diminishing of the lifespan for metallic items. While corrosion may come in many forms and may be the result of many different causes, it is the corrosion that results from the ambient environment within which a part or metallic item is stored or transported to which this invention is directed.

The most common metals which are susceptible to corrosion from ambient or atmospheric conditions are iron or ferrous compounds, aluminium, brass, copper, and lead. The corrosion of such metals, and metallic items created from them, may take the form of oxidation, tarnishing, pitting, discolouration or the mottling of the exterior surface. Traditionally, corrosion of this nature is associated with contact between the metallic surface and liquids, such as water or acidic compounds. However, in many instances the corrosion may be a direct result of the ambient atmospheric conditions within which the metallic item is situated. For example, metallic parts, machinery and raw materials are often exposed to gaseous compounds of oxygen, water vapour, carbon dioxide, nitrogen dioxide, sulphur dioxide and other such gases which can create an inherently corrosive environment. It is therefore imperative that steps be taken to prevent corrosion from exposure to such atmospheric elements, particularly during shipping and storage of metallic items. When such items are also subjected to sodium chloride (for example when shipped by sea or by truck in northern climates during the winter) even further precautionary steps need to be taken.

While a variety of methods and devices have been developed to reduce or help eliminate corrosion during storage and transportation, one of the most promising to date has been the development of vapour phase corrosion inhibitors. In general, vapour phase corrosion inhibitors release gaseous compounds which help to protect the surfaces of metals through the deposition of a protective film or coating on the corrodible surface. Provided that a sufficient supply of the vapour phase corrosion inhibitor is available, a metallic item can be protected for a considerable length of time.

In the shipping and transportation of metallic parts or materials, others have proposed various methods of presenting vapour phase corrosion inhibitors in sufficient supply to ensure a constant deposition onto the corrodible surface. Such devices and methods include the use of foam packing pellets or chips which have been injected with a liquid component that slowly evaporates to provide a constant supply of vapour phase corrosion inhibitor. Similarly, others have utilized solid components that sublimate into a vapour phase corrosion inhibitor. Still others have laminated a cellulose or similar layer to the underside of a tarpaulin or cover and saturated the cellulose layer with a liquid component that evaporates into a vapour phase corrosion inhibitor.

While all of these prior methods and devices have met with some degree of success, they all suffer from their own inherent limitations and difficulties. Utilizing solid or liquid compounds physically applied to the exterior surface of porous substrates and anticipating their rate of sublimation or evaporation into a vapour phase corrosion inhibitor can be difficult, particularly where atmospheric conditions such as temperature and pressure can vary and thereby affect the rate of sublimation and evaporation. The physical nature of the pores in the substrate and the degree of saturation also can affect the rate of release of vapour phase corrosion inhibitor thereby making it difficult to control the concentration of inhibitor surrounding a metallic item. Furthermore, in order to ensure that sufficient levels of solid or liquid corrosion inhibiting compounds are available, the substrates that have thus far been used have been soft and porous with little inherent strength or abrasion resistance. For example, in the case where a liquid corrosion inhibitor is sprayed onto a cellulose layer laminated to the underside of a tarpaulin, the cellulose layer may be subjected to abrasion which may result in an area having little or no corrosion protection. That is, should a portion of the cellulose layer be damaged or stripped off, a section or portion of the metallic item may not receive adequate protection.

Similarly, the use of impregnated foams or silica gels have limited application. To ensure that an adequate supply of the solid or liquid inhibiting compound is adjacent to the corrodible surface, the entire metallic part or component must normally be encapsulated within the foam or silica gel. In addition, the use of impregnated foam or silica gel does not provide protection from the elements of weather, from ultra violet radiation from the sun, nor do they provide a barrier to dust and dirt.

SUMMARY OF THE INVENTION

The invention therefore provides a vapour phase corrosion inhibitor composite material that addresses the short comings of the prior art devices by providing a water, wind and dust resistant composite material of significant strength, tear and abrasion resistance and that ensures a constant and adequate supply of vapour phase corrosion inhibitor adjacent to metallic materials wrapped therein.

Accordingly, in one of its aspects the invention provides a water resistant and vapour phase corrosion inhibitor composite material for wrapping around metallic items to protect such items and reduce corrosion during storage and transportation, the composite material comprising a high strength, tear resistant, flexible scrim; a low density layer, said low density layer impregnated with a solid form vapour phase corrosion inhibitor of from about 1 to 15 percent by weight, said solid form vapour phase corrosion inhibitor volatilizing, at a known rate, into a gaseous phase by way of sublimation; and, a barrier layer, said barrier layer reducing the transmission of water, water vapour, oxygen and other environmental gases through said composite material to said metallic item and also reducing the atmospheric loss of said gaseous vapour phase corrosion inhibitor from between said composite material and said metallic item, each of said scrim, said barrier layer and said low density layer being formed from a polyolefin material and together forming a multi-layered polyolefin composite material.

In a further aspect the invention provides a method of producing a water resistant and vapour phase corrosion inhibitor composite material for wrapping around metallic items to protect such items and reduce corrosion during storage and transportation, the method comprising the steps of extruding polyolefin resin onto opposite sides of a high strength, tear resistant, flexible, polyolefin scrim to form a high density barrier layer on one side of said scrim and a low density layer on the opposite side of said scrim; adding a solid form vapour phase corrosion inhibitor to said polyolefin resin prior to extrusion of said low density layer to distribute said solid form vapour phase corrosion inhibitor throughout said low density layer without significant volatilization of said solid form vapour phase corrosion inhibitor during said extrusion process, said volatilization of said solid form vapour phase corrosion inhibitor during said extrusion process minimized by carrying out said extrusion process at temperatures of approximately 250 to 280 degrees Celsius; and, embossing the outer surface of said low density layer, at the time of extrusion of said low density layer, to increase the surface area thereof and provide an anti-skid surface thereon, said high density barrier layer, said scrim and said low density layer together forming a bonded multi-layered composite material.

Further objects and advantages of the invention will become apparent from the following description taken together with the accompanying drawings.

BRIEF DESCRIPTION OF THE DRAWINGS

For a better understanding of the present invention, and to show more clearly how it may be carried into effect, reference will now be made, by way of example, to the accompanying drawings in which.

DESCRIPTION OF THE PREFERRED EMBODIMENT

Figure 1:
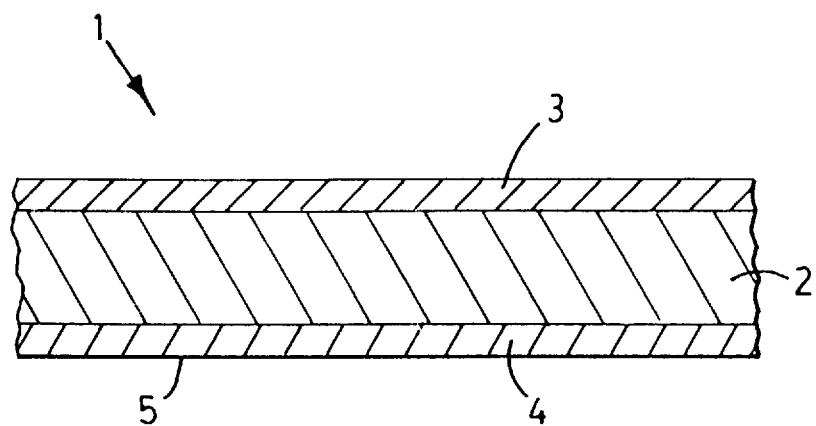
FIG. 1 is a side sectional view of the preferred embodiment of the composite material according to the present invention; and, FIG. 2 is a side sectional view of an alternate embodiment of the present invention.

The water resistant and vapour phase corrosion inhibitor composite material according to the present invention is shown in the drawings and noted generally by the reference numeral 1. As its name suggests, material 1 is a true composite and formed from three separate and distinct layers. In the preferred embodiment composite material 1 comprises a high strength, tear resistant and flexible substrate or scrim 2 which is bordered on its upper surface by a barrier layer 3 and on its lower surface by a low density layer 4. In an alternate embodiment, which will be described more completely later, scrim 2 is bonded to the lower surface of barrier layer 3 and low density layer 4 is bonded to the upper surface of barrier layer 3.

The scrim 2 provides a strong and flexible substrate or base which in effect carries barrier layer 3 and low density layer 4. The flexibility of scrim 2, and hence composite material 1, enables the material to be rolled or folded for convenience of use and storage, and also allows it to be readily wrapped around items of varying shape and size.

It will be appreciated that in order for composite material 1 to be useful for a wide variety of different applications it must not only be strong and flexible but must also exhibit high resistance to tearing, must be abrasion resistant, must be relatively light in weight, and must be sufficiently low in cost. Furthermore, today's business and social-economic climate requires that packing materials be recyclable in order to reduce waste and the amount of material that must be shipped to landfill sites. In many cases business must pay for waste disposal and therefore any reduction in non-recyclable waste can result in cost savings. It is therefore desirable, and in some cases imperative, that composite material 1 be completely recyclable.

For the above reasons, in the preferred embodiment scrim 2 is comprised of woven polyolefin. Within the woven material individual fibres are arranged in an approximately 90 degree grid thereby providing both an increased level of overall strength and superior tear resistance. The woven polyolefin scrim also serves as a "backbone" or weight bearing layer for composite material 1. Scrim 2 provides for a flexible and light weight composite product that can be readily used to wrap practically any shaped item. Woven polyolefin scrim 2 is also easily recyclable and does not present the disposal problems that are common with traditional vapour phase corrosion inhibitor products that contain nitrites and are made from paper that has been reinforced with an olefin substrate.

Covering the upper surface of scrim 2 is barrier layer 3. Barrier layer 3 provides an relatively impermeable layer that significantly reduces or eliminates the transmission of water, water vapour, oxygen, carbon dioxide, nitrogen dioxide and other atmospheric gases or elements therethrough. By preventing the transmission of such gases or elements through composite material 1, barrier layer 3 helps to reduce or eliminate corrosive or corrosion inducing compounds and gases from coming into contact with the metallic item wrapped in composite material 1. Barrier layer 3 also helps to create a relatively impermeable membrane surrounding the wrapped item in order to limit the escape of vapour phase corrosion inhibitor from between composite material 1 and the wrapped item.

To ensure a high integrity bond between barrier layer 3 and scrim 2, and to facilitate in the recycling of composite material 1, barrier layer 3 is also comprised of polyolefin, and preferably polyethylene or polypropylene. This polyolefin layer has been found to also provide a tough and abrasion resistant exterior surface that can stand up to the abuse to which it will be subjected when used to wrap metallic parts, machinery or other materials during transportation or storage. In addition, barrier layer 3 presents a surface onto which packaging information, labelling or advertising can be readily printed. In the preferred embodiment barrier layer 3 is a high density barrier layer having a specific gravity of approximately 0.94 to 0.97, however, it will be appreciated that a lower density film that is laminated to scrim 2 may also be utilized.

In the preferred embodiment low density layer 4 is bonded to the under side of scrim 2. Low density layer 4 is impregnated with a vapour phase corrosion inhibitor which is preferably within a ratio of from about 1 to 15 percent by weight of the layer. The vapour phase corrosion inhibitor in low density layer 4 is in the form of a solid that is volatized directly into a vapour phase by way of sublimation. A concentration of solid form vapour phase corrosion inhibitor within the above range has been found to produce a sufficiently high level of inhibitor vapour for an appropriate length of time to provide for extended and reliable corrosion protection for metallic items that are wrapped in composite material 1. The approximate rate of sublimation of the solid form vapour phase corrosion inhibitor can be determined so that with a known volatilization rate, and for a given concentration of inhibitor, the useful life of composite material 1 can be determined. Depending upon ambient conditions, the above structure has been found to provide reliable protection for a period of from approximately 6 months to 2 years.

To enhance the volatilization of the vapour phase corrosion inhibitor impregnated into low density layer 4 the exterior or bottom surface 5 of low density layer 4 is preferably embossed, thereby significantly increasing its surface area. It has also been discovered that through embossing bottom surface 5 an anti-skid quality is provided on the surface. This feature has been noted to be advantageous from the perspective of helping to prevent composite material 1 from slipping or sliding around on smooth metallic surfaces, particulary when used to wrap items in transport. The movement of composite material 1 across the surface of wrapped items can cause abrasion and can remove portions of low density layer 4. Abrasion can also cause the removal of the protective film or coating of vapour phase corrosion inhibitor that has been deposited or condensed upon the metallic surface. Through reducing slippage, the embossed bottom surface 5 therefore helps to reduce the deleterious effects of abrasion between composite material 1 and the items over which it is wrapped.

The precise chemical composition of the vapour phase corrosion inhibitor impregnated into low density layer 4 may vary as there are a number of commercially available products that can be readily used. However, due to carcinogenic concerns that have recently come to the attention of medical researchers, the vapour phase corrosion inhibitor utilized in the present invention is preferably devoid of nitrite compounds. Typically, vapour phase corrosion inhibitor compounds that do not contain nitrite compounds and that are commercially available are formulations comprising amine benzoates, amine nitrates or benzotriazole. An example of a commercially available compound which has been found to satisfy the requirements for the vapour phase corrosion inhibitor of the present invention is VCI M126R, manufactured by Cortec Corp.

Figure 2:
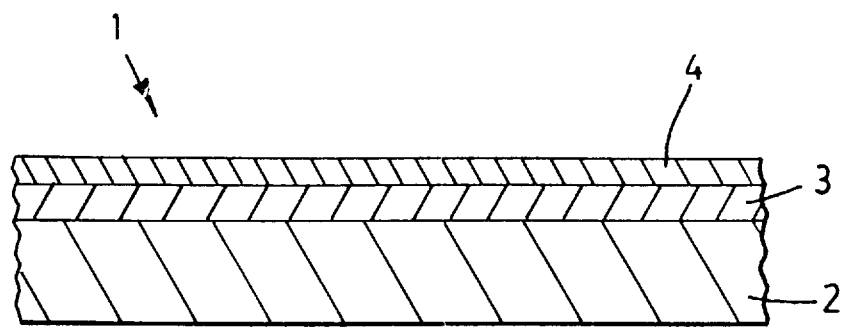

In the preferred embodiment low density layer 4 is also comprised of a polyolefin material and has a specific gravity of approximately 0.90 to 0.93. Forming layer 4 from a polyolefin product ensures that all three layers of composite material 1 are completely recyclable and that material 1 can be readily melted and re-pelletized for re-use. This provides a significant advantage over the traditional prior art products that utilize a combination of cellulose and plastic which is not readily recyclable. Furthermore, the fact that each of low density layer 4, barrier layer 3, and scrim 2 are formed from a polyolefin allows for an enhanced level of bonding between the respective layers without the addition of adhesives or complex or costly mechanical bonding steps or procedures. In the preferred embodiment barrier layer 3 and low density layer 4 are extruded onto scrim 2 thereby forming a strong bond between the respective layers. Alternately the respective layers may be extruded sequentially and heat sealed or laminated together. In the further embodiment as shown in FIG. 2, barrier layer 3 and low density layer 4 are co-extruded onto scrim 2 to form composite material 1. As will be understood by those skilled in the art, co-extrusion involves the extrusion of two or more polymers simultaneously through the same die such that the molten masses are in contact with each other thereby forming a bond between them.

Preferably the vapour phase corrosion inhibiting compound is added to low density layer 4 during extrusion. This helps to ensure that the vapour phase corrosion inhibitor remains chemically intact and that it is not volatized off during the extrusion process. It has been found that the preferable method of achieving this result is to mix the vapour phase corrosion inhibitor compound with low density polyolefin resin prior to extrusion and then extrude the combined product at below normal extrusion temperatures. That is, while typically polyolefin extrusions are carried out at temperatures of approximately 285 to 310 degrees Celsius, in the preferred embodiment of the present invention the extrusion of low density layer 4 is carried out at approximately 250 to 280 degrees Celsius. This below normal temperature has been found to significantly reduce the volatilization of the vapour phase corrosion inhibitor during extrusion. As a result, the formation of pockets of gaseous vapour phase corrosion inhibitor within low density layer 4, and atmospheric loss of inhibitor during extrusion, has been greatly reduced.

For particular shipping and storage applications a single, strong, water resistant, corrosion inhibiting covering material that also has fire or flame retarding capabilities can have significant advantages. For this purpose, in the preferred embodiment a flame retardant compound is added to composite material 1. In applications where flame retarding capabilities are important or mandatory, the flame retardant can be added to both barrier layer 3 and scrim 2. In other cases the flame retardant compound may be added to barrier layer 3 only. The addition of the flame retardant compound to barrier layer 3 ensures that the compound is present within the exterior surface of composite material 1 when it is in use. Including the flame retardant compound in scrim 2 will ensure that composite material 1 retains its flame retarding capabilities even where barrier layer 3 has been damaged or worn off.

When exposed to fire, the flame retarding compound helps to reduce the spreading or transmission of flames across composite material 1. It has been found that commercially available flame retardant products that contain antimony trioxide and/or brominated phenol provide protection consistent with National Fire Protection Association Testing Standard #701L and allow for addition during the extrusion of the respective layers.

It has also been found that flame retarding compounds and vapour phase corrosion inhibiting compounds are generally incompatible when mixed in the same polymer melt. Accordingly, by locating the flame retarding compound in high density barrier layer 3, and/or scrim 2, and the vapour phase corrosion inhibiting compound in low density layer 4, any such incompatibilities that may exist are eliminated. The two compounds are physically separated in different layers and are not intermixed.

As a further feature of the present invention, if desired scrim 2 may be pigmented to limit the transmission of light and ultraviolet radiation through composite material 1. Under some circumstances the materials being encased or wrapped in composite material 1 may be sensitive to light or ultraviolet radiation. Accordingly, through the pigmentation of scrim 2 the amount of light that is allowed to pass through composite material 1 can be controlled, thereby reducing photo degradation of articles wrapped therein. It will be appreciated that high density barrier layer 3 may also be pigmented in addition, or as an alternative, to the pigmentation of scrim 2. The use of different shades of pigmentation can also be used as a means of identifying particular types of material (for example with or without a flame retarding compound) or may be used to identify the source or type of material that is being transported or stored.

As mentioned, in a further embodiment of the present invention both high density layer 3 and low density layer 4 are positioned on the same side of scrim 2 (see FIG. 2). Here high density layer 3 is effectively sandwiched between scrim 2 and low density layer 4. This embodiment functions essentially the same as the embodiment shown in FIG. 1 except that when in use the outermost surface of composite material 1 will be comprised of scrim 2. Since scrim 2 provides the majority of the strength and tear resistance for the composite material, it will be appreciated that under some conditions of use the structure of FIG. 2 will be preferable.

It is to be understood that what have been described are the preferred embodiments of the invention and that it is possible to make variations to these embodiments while staying within the broad scope of the invention. Some of these variations have been discussed while others will be readily apparent to those skilled in the art. For example, while in the preferred embodiment scrim 2 has been described as a woven material, it could also be comprised of a knit, a non-woven, a tri-axial weave or a stitchbond material having sufficient strength for the particular application for which it is to be used.

We claim:

1. A water resistant and vapour phase corrosion inhibitor composite material for wrapping around metallic items to protect such items and reduce corrosion during storage and transportation, the composite material comprising:

(i) a high strength, tear resistant, flexible woven scrim;
   (ii) a low density layer, said low density layer impregnated with a solid form vapour phase corrosion inhibitor of from about 1 to 15 percent by weight, said solid form vapour phase corrosion inhibitor volatilizing, at a known rate, into a gaseous phase by way of sublimation; and,
   (iii) a high density barrier layer, said high density barrier layer reducing the transmission of gases and liquids through said composite material, each of said woven scrim, said barrier layer and said low density layer being formed from a polyolefin material and together forming a multi-layered polyolefin composite material such that when wrapped around a metallic item said vapour phase corrosion inhibitor volatilizes from said low density layer forming a concentration of vapour phase corrosion inhibiting gas about the metallic item, said high density barrier layer preventing volatilization and migration of said vapour phase corrosion inhibitor through said composite material, said high density barrier layer further limiting the loss of said vapour phase corrosion inhibitor into the atmosphere and retaining said concentration of vapour phase corrosion inhibiting gas about said metallic item.

2. A composite material as claimed in claim 1 wherein said low density layer has an outer embossed surface, said embossed surface increasing the exposed surface area of said low density layer and thereby enhancing said volatilization of said vapour phase corrosion inhibitor impregnated therein.

3. A composite material as claimed in claim 2 wherein said barrier layer is a high density barrier layer having a specific gravity of approximately 0.94 to 0.97.

4. A composite material as claimed in claim 3 wherein said high density barrier layer is bonded to the upper surface of said scrim and said low density layer bonded to the upper surface of said high density layer.

5. A composite material as claimed in claim 3 wherein said high density barrier layer is bonded to the upper surface of said scrim and said low density layer bonded to the bottom surface of said scrim.

6. A composite material as claimed in claim 5 wherein said embossed surface also provides an anti-skid surface on said low density layer, said anti-skid surface reducing the sliding of said composite material across the surface of said metallic item when said metallic item is wrapped therein.

7. A composite material as claimed in claim 6 wherein said scrim is a woven, flexible ply of polyolefin material.

8. A composite material as claimed in claim 7 including a flame retardant compound that reduces the transmission of flames across said composite material when said material is subjected to fire.

9. A composite material as claimed in claim 8 wherein said high density barrier layer and said low density layer are extruded layers formed sequentially and heat sealed or laminated to said scrim.

10. A composite material as claimed in claim 8 wherein said high density barrier layer and said low density layer are co-extruded onto said scrim.

11. A composite material as claimed in claim 8 wherein said high density barrier layer and said low density layer are extruded layers formed and applied contemporaneously to said scrim.

12. A composite material as claimed in claim 11 wherein said low density layer is formed at extrusion temperatures of from about 250 to 280 degrees Celsius to minimize the volatilization of said vapour phase corrosion inhibitor impregnated therein.

13. A composite material as claimed in claim 12 wherein said flame retardant compound is contained within said scrim.

14. A composite material as claimed in claim 12 wherein said flame retardant compound is contained within said high density barrier layer.

15. A composite material as claimed in claim 14 wherein said flame retardant compound is added to said high density barrier layer, and said vapour phase corrosion inhibitor is added to said low density layer, during said extrusion of said layers such that said flame retardant compound and said vapour phase corrosion inhibitor are distributed generally evenly throughout said respective high density barrier layer and said low density layer without any physical mixing of said flame retardant and said vapour phase corrosion inhibitor compounds.

16. A composite material as claimed in claim 15 that is readily re-pelletized for recycling purposes.

17. A composite material as claimed in claim 16 wherein said vapour phase corrosion inhibitor is devoid of nitrite compounds.

18. A composite material as claimed in claim 17 wherein said scrim is pigmented, said pigmentation limiting the transmission of light through said composite material and the photo degradation of items wrapped therein.

19. A composite material as claimed in claim 17 wherein said high density barrier layer is pigmented, said pigmentation limiting the transmission of light through said composite material and the photo degradation of items wrapped therein.

* * * * *